Sept. 5, 1933.　　　B. K. GILLESPIE　　　1,925,691
AUTOMOBILE BASKET
Filed Dec. 4, 1929　　　2 Sheets-Sheet 1
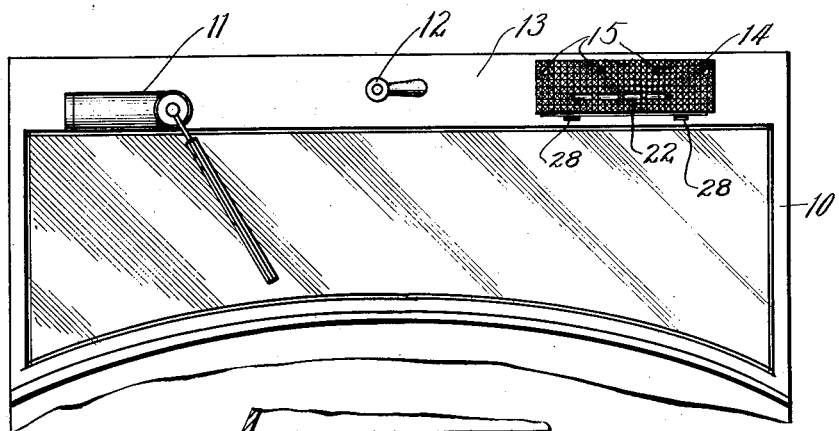
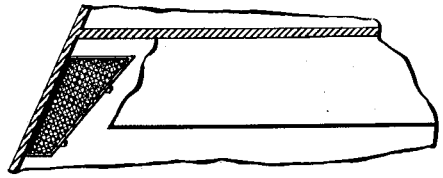
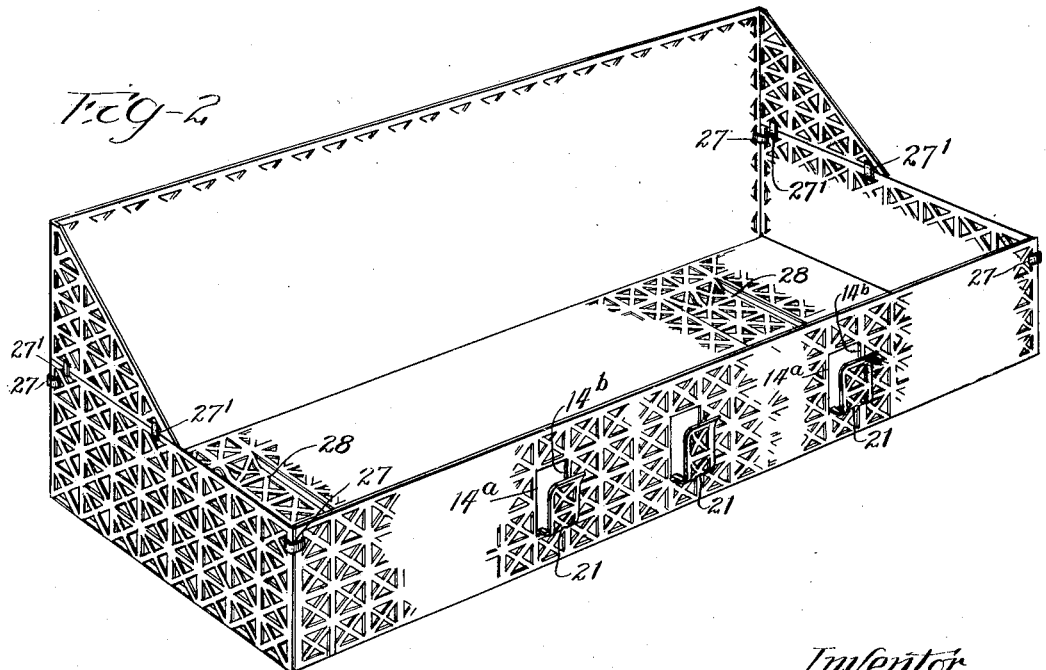

Sept. 5, 1933. B. K. GILLESPIE 1,925,691
AUTOMOBILE BASKET
Filed Dec. 4, 1929   2 Sheets-Sheet 2
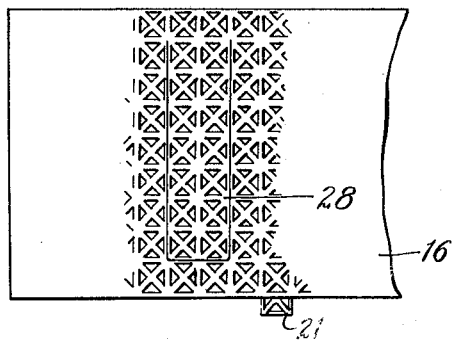
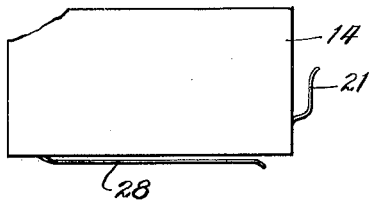
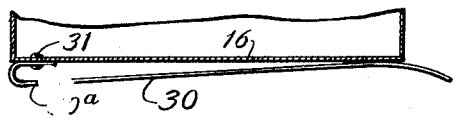
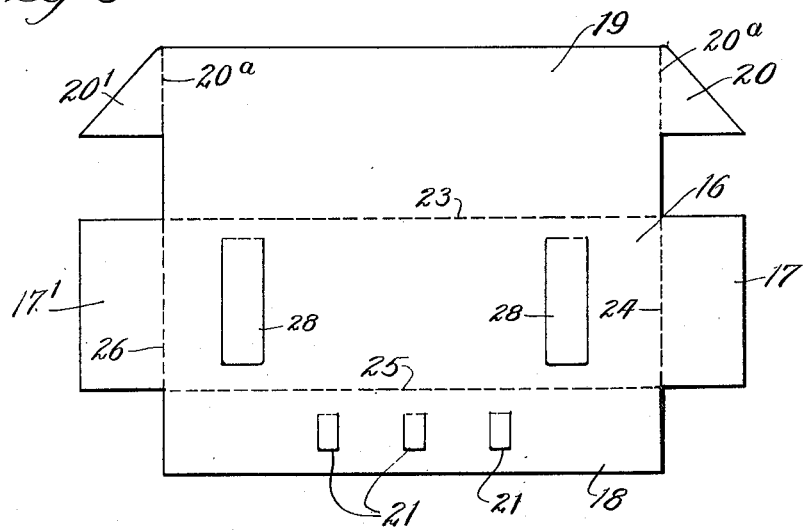
Inventor:
Bee K. Gillespie Patented Sept. 5, 1933

1,925,691

UNITED STATES PATENT OFFICE 1,925,691

AUTOMOBILE BASKET

Bee K. Gillespie, Chicago, Ill.

Application December 4, 1929. Serial No. 411,454

8 Claims. (Cl. 220—1)

My invention relates generally to baskets and has to do especially with a novel form of basket adapted particularly for use in connection with automobiles.

It will be appreciated that in the use of automobiles for touring, or otherwise, one has occasion from time to time for use of various articles, such as gloves, smoking articles, writing articles, maps, etc. These smaller articles tend to become scattered promiscuously about the automobile and, in many instances, become lost with attendant inconvenience. At times the attention of the driver of the automobile is directed away from the road in attempting to find misplaced articles such as the above, with resultant danger.

One of the objects of my invention is to remedy the foregoing condition by providing a simple, inexpensive, and very durable, basket which may be mounted within convenient reach of the operator of the automobile for holding articles that are used from time to time such as gloves, smoking materials, writing materials, maps, etc.

Another object is to provide a basket which is provided with self-contained basket forming means for grippingly supporting objects such as pencils, maps, etc. in such a way that they may be readily and easily placed in or removed from the basket without inconveniencing the driver or other occupants of the automobile.

A further object is to provide a basket of the foregoing character which is formed from a single blank of open-work metal, and which blank is of such shape as to provide a sturdy mounting for the basket and to also strengthen the walls of the basket against distortion of the same from the weight of the articles and from the weight of the hand of a person resting upon the same in placing articles therein or removing them therefrom.

Other and more specific objects are to provide a basket of the foregoing character which has a wall thereof shaped to form an integral writing-instrument holder of a character adapted to grippingly hold the writing instrument accessible for ready and quick removal of the same without directing attention of the operator, or others, away from the road; and to provide another wall having self-acting grip means, constituting a part of the basket structure, adapted to hold maps, and the like, readily accessible and which permits ready and quick placement or removal of the same.

Other objects and advantages will become apparent as this description progresses and by reference to the drawings wherein,—

Figure 1 is an elevational view of the front portion of an automobile, showing the interior thereof (looking toward the front windshield), with my invention applied thereto;

Fig. 2 is a perspective view illustrating the form of basket shown in Fig. 1;

Fig. 3 is a bottom plan view of a portion of the structure shown in Fig. 2;

Fig. 4 is a fragmental end view of the structure shown in Figs. 2 and 3 and illustrating the bottom clip means;

Fig. 5 is an outline plan view of the blank from which the basket of Fig. 2 is formed;

Fig. 6 is a view similar to Fig. 4 and showing a modified form of bottom clip; and Fig. 7 shows still another modified form of basket and mounting.

Referring particularly to Fig. 1 of the drawings, I have chosen to illustrate my invention as applied to a conventional form of automobile body construction which includes the usual windshield 10, windshield wiper 11 and windshield operating device 12. The same panel structure 13 which supports the windshield wiper 11 may also be utilized to support my novel basket structure which I may designate (Fig. 1) generally by the numeral 14. One of the walls of this basket is attached to the panel by any suitable form of fastening devices, for example, the screws 15. This basket may be mounted in various ways, but I, preferably, mount it in such a way that it does not extend below the top edge of the windshield although it may be mounted, if desired, to extend slightly below the top of the windshield 10 without departing from my invention and without materially obstructing forward vision.

The basket may be formed of any suitable durable material, but I, preferably, form the same of a metal having some resiliency and which may be readily cut or stamped and formed to the final shape shown in Fig. 2. Also, for the sake of lightness, ventilation and appearance I prefer to use a blank of metal having the open-work formation which is most clearly shown in Fig. 2. This form of open-work provides substantial and durable metal surfaces along which the blank may be readily folded without danger of breakage and also provides for cutting of the metal along predetermined lines or surfaces forming smooth edges.

The blank may be formed by cutting or stamping to the shape shown in Fig. 5 providing a bottom portion 16, end walls 17, 17', side walls 18, 19 and strengthening flaps 20, 20' carried by the side wall 19. At the time the blank is formed, there are also struck from the side wall 18 a plurality of tongues 21 (preferably three) which, when formed as shown in Fig. 2, provide gripping fingers for holding a writing instrument such as a pen or pencil 22 as clearly illustrated in Fig. 1. In cutting out these fingers or tongues 21, the metal is cut along the vertical and horizontal metal line-surfaces 14$^a$ and 14$^b$ so that the struck-out parts are not only attractive in appearance due to the open-work formation, but also provide flexible units.

The formed blank is folded along the horizontal metal surface-lines 23, 24, 25 and 26 so that the side and end walls are substantially at right angles to the bottom wall, and these walls are secured together at their vertical meeting edges by suitable metal bands 27 passed through the openings provided by the open metal work. The triangularly-shaped strengthening flaps 20, 20' are then folded inwardly along vertical metal surface-lines 20$^a$ until their bottom edges rest upon the top edges of the end walls and they are then secured in place by other metal flaps 27' similar to the flaps 27.

The side wall 19, which I may term the rear wall, is, preferably, much deeper than the side or front wall 18. This deep back wall provides a large and sturdy support for the basket when attached to the automobile and also provides an arrangement whereby the basket may be attached in a somewhat suspended manner, if desired, without giving up any of its strength or durability qualities. This deep wall permits of attachment of the basket in positions where space is limited and, in some instances, the entire rear wall may be resting against the supporting surface while in other instances only its upper portion may be resting against the supporting surface. In either of these cases, it will be appreciated that the articles placed in the basket might tend, if not guarded against, to sag the forward part of the basket and this condition might be exaggerated by the operator placing his hand in or upon the basket from time to time to remove articles therefrom. However, this sagging action is prevented by the strengthening flaps 20, 20' which bind the end walls rigidly to the rear supporting wall and thereby hold the basket structure as a whole in a predetermined non-sagging condition.

The gripping fingers struck from the front basket wall are struck outwardly and then bowed inwardly and then turned outwardly to provide yielding grip elements which, together with the adjacent wall of the basket, hold a writing instrument, such as the pencil 22 (Fig. 1), in a predetermined position where it may be readily grasped by an occupant of the automobile. By spacing the fingers 21 apart as shown, unobstructed spaces between the fingers are provided whereby the writing instrument may be readily and quickly grasped and removed, or it may be replaced, without the driver or other person actually taking his attention away from the road. In fact, if the writing instrument should be gripped by only one of the fingers 21, it will be held in place so that it will be readily accessible.

In the use of automobiles, particularly during touring, it may be necessary to refer quite often to different maps (such as city, state, etc. maps) and it is desirable that these be kept in a convenient place to avoid delay and inconvenience to the driver. To that end, my basket is provided on its underside with, preferably (but not necessarily), two flexible gripping members 28, each of which (or the two together) is adapted to hold a map in place. These members are, preferably, struck from the bottom wall 16 at the time the blank is stamped out; however, they may take the form of separate spring pieces 30, if desired, as shown in Fig. 6. In the preferred form (Fig. 4), these map gripping fingers extend forwardly and are so bowed that they cooperate with the exterior surface of the bottom wall to tightly hold the map or other object inserted therebetween, the metal being sufficiently resilient to yieldingly hold the map or other object. The outer ends of the members 28 are turned downwardly (Fig. 4) to provide for ready insertion of the object between the member and bottom wall.

In the form of Fig. 6, the spring members have flared rear parts 30$^a$ which are attached in any desired manner as at 31 to the rear of the bottom of the basket. From its flared part 30$^a$, the spring member is curved downwardly and then forwardly upon itself and is bowed slightly upward to engage the forward bottom part of the basket under tension. The member 30 is long enough to extend slightly beyond the forward edge of the basket and this extending part is turned slightly downward to provide a projecting tongue which permits of ready insertion of a map or other object between the spring member and the bottom of the basket as will be obvious.

From the foregoing, the advantages of my invention will be apparent. It is very simple in construction and is exceedingly cheap to manufacture. It is very strong and durable and will readily support heavy objects without sagging or other distortional effects. The basket may be placed at any position which is convenient to the operator so that the articles which he may want from time to time can be placed therein and can be removed by him at will without withdrawing his attention from the operation of the automobile. If desired, the basket may be mounted in the back of the front seat or under the cowl of the automobile at either side. In the latter event, however, to avoid interfering with the operator's comfort and give him freedom in the use of his legs, the basket preferably takes an irregular shape such as shown in Fig. 7. Articles which may be required from time to time will always be in their proper place and there will be no delay occasioned by hunting for such articles, and the danger of loss of small articles is eliminated.

While I have shown and described several forms of my invention, it will be understood that other changes in details and arrangement of parts may be made without departing from the spirit and scope of my invention as defined by the claims which follow. For example, side walls 18 and 19 may be of a length to extend entirely across the panel 13 and it may be provided with partitions dividing it into a plurality of compartments. In that case, the usual rear-vision mirror may be mounted on the basket wall 18, and the windshield operating handle 12 and other operating devices may extend through the basket, or may be placed in any desired position for ready accessibility.

I claim:

1. A basket of the character described having bottom, side and end walls, one of said side walls being of a width greater than said end walls to extend thereabove, triangularly-shaped flaps integrally carried by the upwardly projecting end edges of said latter side wall, the base or bottom part of said flaps being secured to the upper edge of said end walls.

2. A basket of the character described formed from a single blank of open-work metal which comprises bottom, side and end walls, said side and end walls being folded at substantially right angles to said bottom, metal band means fastening the adjacent vertical edges of the side and end walls together, one of said side walls being wider than the other so that its upper edge projects above the upper edges of the other walls, and brace flaps integral with said latter side wall and folded to align vertically with said end walls, and band means for fastening the bottom edges of said flaps and top edges of said end walls together.

3. In a metal basket having bottom, side, and end walls, one of said side walls having extensions secured to the upper edge of the end walls to lend support thereto, a tongue struck outwardly from the other of said side walls to provide a yieldable gripping member exteriorly accessible for removably supporting an object.

4. A basket of the character described, having bottom, side and end walls, one of said side walls being of a width greater than said end walls to extend thereabove, flaps carried by the upwardly projecting end edges of the said latter side wall and adapted to be secured to the upper edge of the end walls, a plurality of tongues struck from the other of said side walls for yieldably gripping and supporting an object.

5. The combination in a metal basket, adapted to be secured to an automobile panel, of side and end walls, one of said side walls being deeper than the other for attachment of the same to said panel at different elevations on the latter, means for attaching said one side wall to said panel, and flaps integrally carried by said one side wall and attached to the top edges of said end walls for bracing the basket as a whole when suspended from said panel.

6. In a metal basket having bottom, side and end walls formed of "open-work" material, extensions of the same kind of material on one of said side walls secured to the upper edge of the end wall to lend support thereto, said bottom having flexible members formed thereon at one edge thereof and being of a length to extend across said bottom adjacent its other edge, said members being so shaped as to tensionally cooperate with the bottom, the end portion of each of said members being turned slightly downward from said other edge of the bottom for engagement by an article to be retained by said members.

7. A metal blank for forming a basket which takes the form of bottom side and end wall sections all integrally connected, one of said side walls having extensions in blank form spaced from said end walls and adapted when folded to engage the upper edges of the end walls, another of said side wall sections having a plurality of strips struck therefrom and shaped to cooperate with the adjacent side wall surface to grippingly receive an object, and similar strips struck from said bottom wall section.

8. A metal blank for forming a basket which takes the form of bottom side and end wall sections all integrally connected, one of said side walls having extensions in blank form spaced from said end walls and adapted when folded to engage the upper edges of the end walls, another of said side wall sections having a plurality of strips struck therefrom outwardly at spaced intervals and shaped to cooperate with the adjacent side wall surface to grippingly receive an object, and similar spaced strips struck from said bottom wall section, all said sections and strips being of a character adapted to be formed at a single stamping, or similar, operation.

BEE K. GILLESPIE.